US006346565B1

(12) United States Patent
Daifuku et al.

(10) Patent No.: US 6,346,565 B1
(45) Date of Patent: Feb. 12, 2002

(54) SYNTHETIC RESIN COMPOSITION FOR RESIN MAGNET, MOLDED RESIN MAGNET, AND PRODUCTION PROCESS FOR SYNTHETIC RESIN COMPOSITION

(75) Inventors: Hideharu Daifuku, Fujisawa; Kota Kawano, Yokohama, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/609,549

(22) Filed: Jul. 3, 2000

(30) Foreign Application Priority Data

Jul. 2, 1999 (JP) .......................... 11-189168
Oct. 4, 1999 (JP) .......................... 11-282824
Oct. 26, 1999 (JP) .......................... 11-303450

(51) Int. Cl.$^7$ ................................ C08K 3/10
(52) U.S. Cl. ..................................... 524/436
(58) Field of Search ........................... 524/436

(56) References Cited

U.S. PATENT DOCUMENTS 3,859,130 A * 1/1975 Parker ...................... 117/240
4,547,425 A * 10/1985 Naruse ...................... 428/328
4,654,249 A * 3/1987 Barbey ...................... 428/148
4,701,372 A * 10/1987 Akiyama .................... 428/323
4,957,774 A * 9/1990 Doi .......................... 427/45.1
4,969,968 A * 11/1990 Leatherman ............. 156/272.4
5,965,194 A * 10/1999 Troung ...................... 427/127

* cited by examiner

Primary Examiner—Paul R. Michl
(74) Attorney, Agent, or Firm—Sughrue Mion, PLLC (57) ABSTRACT

A resin composition for a resin magnet includes a resin binder containing a thermoplastic resin as a main component and a polymerized fatty acid based polyamide elastomer: and a magnetic powder mixed and dispersed in said resin binder. The resin composition further contains an ultra fine powder of an inorganic filler having a particle size of 1 $\mu$m or less. A process of producing pellets of a resin composition for a resin magnet, includes the steps of: mixing pellets of a binder resin with a magnetic powder on a batch processing basis; supplying the mixture to a kneading-extruder by means of a counting feeder; and extrusion-molding the mixture, to obtain pellets of a molding material for a resin magnet, in which the magnetic powder is mixed and dispersed in the binder resin.

22 Claims, 3 Drawing Sheets

SYNTHETIC RESIN COMPOSITION FOR RESIN MAGNET, MOLDED RESIN MAGNET, AND PRODUCTION PROCESS FOR SYNTHETIC RESIN COMPOSITION

BACKGROUND OF THE INVENTION

The present invention relates to a synthetic resin composition for a resin magnet, which is produced by mixing and dispersing a magnetic powder in a resin binder, and which is suitably used as a molding material for forming a molded resin magnet adapted for a magnet roller used for an electrophotographic system or an electrostatic recording system, and also relates to a resin magnet molded from the synthetic resin composition into a desired shape.

A development method characterized by supplying toner with the aid of a so-called jumping phenomenon has been used for an electrophotographic system or electrostatic recording system such as a copying machine or printer. To be more specific, according to such a development method, as a developing roller for visualizing an electrostatic latent image on a latent image support such as a photosensitive drum, a magnet roller formed of a resin magnet is disposed in a rotating sleeve, whereby toner is supplied to the surface of the latent image support with the aid of the jumping phenomenon, which allows the toner supported on the surface of the sleeve to be jumped on the latent image support by the magnetic force characteristic of the magnet roller, to visualize the electrostatic latent image.

The above-described magnet roller has been produced in accordance with the process of preparing a synthetic resin composition for a resin magnet by mixing a magnetic powder in a binder composed of a thermoplastic resin, and injection-molding or extrusion-molding the resin composition by using a mold around which a magnetic field is formed, thereby forming the resin composition into a roller shape and simultaneously magnetizing it into a desired magnetic characteristic.

With the recent advance of electrophotographic systems and the like, the above magnet roller has been required to have a more complicated magnetic force pattern, and to meet such a requirement, there have been often adopted a magnet roller including a plurality of magnet pieces. The magnetic pieces, each of which is molded from the above synthetic resin composition and magnetized into one magnetic pole as one component of the desired magnetic pattern, are stuck around a shaft, to thereby achieve the desired magnetic force pattern as a whole.

The synthetic resin composition for a resin magnet adapted for the above magnet roller has been produced by mixing and dispersing a magnetic powder of ferrite or a rare earth magnet alloy in a resin binder composed of a polyamide resin such as polyamide 6 or polyamide 12, or polypropylene.

However, with the recent tendency toward higher quality, higher speed, and higher accuracy of OA equipment, the above magnet roller has been required to have a higher magnetic force. Additionally, in other fields, resin magnets have been usually required to have higher magnetic forces.

To meet such a requirement, it is required to increase the content of a magnetic powder in a synthetic resin composition for a resin magnet adapted for a magnet roller and the like; however, if the content of a magnetic powder is increased, the flowability of the molten resin composition Is lowered, so that the moldability of the molten resin composition is significantly reduced, to cause both the variation in magnetic force of a molded product and degradation of the dimensional accuracy thereof. For this reason, the content of a magnetic powder in a synthetic resin composition has been limited. In other words, it has been difficult to add, to a resin composition, a magnetic powder in an amount large enough to obtain a necessary high magnetic force.

A resin magnet has been used not only for the above-described magnet roller but also for various general-purpose parts, particularly, for precise parts of electric/electronic equipment. In this case, such a resin magnet has been produced by molding the above resin composition into a desired shape. The resin magnet thus produced, however, fails to sufficiently satisfy high dimensional accuracies required for the magnet roller and precise parts of electric/electronic equipment.

To be more specific, a resin magnet used for a magnet roller of an electrophotographic system or electrostatic recording system and precise parts of electric/electronic equipment requires a very severe quality in terms of dimensional accuracy and environmental change in dimension; however, the resin magnet produced by molding the above resin composition is insufficient in its dimensional accuracy because of contraction of the resin after molding, and even if the resin magnet exhibits a good dimensional accuracy at the time of molding, it cannot keep the dimensional accuracy for a long-period of time because of expansion and/or camber of the resin magnet caused by absorption of moisture in a service environment.

By the way, a resin magnet for a magnet roller has been produced in accordance with a process of preparing a resin composition by mixing and dispersing a magnetic powder in a resin binder and extruding the mixture into pellets, and injection-molding or extrusion-molding the pellets of resin composition into a roller shape and simultaneously magnetizing the roller-shaped product into a desired magnetic characteristic.

The above-described pellets of the resin composition to be injection-molded or extrusion-molded into a resin magnet have been produced by mixing a magnetic powder in a binder resin and extruding the mixture into pellets. In this case, as the above binder resin, a resin generally commercially available in the form of pellets has been used. The pellets of resin composition have been produced by pulverizing the pellets of resin, mixing the pellets thus pulverized with a magnetic powder, and extruding the mixture into pellets.

The reason why the pellets of resin are pulverized once before being mixed with a magnetic powder is as follows:

(1) If the pellets of binder resin are directly mixed with the magnetic powder, the binder resin is separated from the magnetic powder upon input of the pellets of binder resin and magnetic powder in a kneader or during the kneading operation thereof, with a result that the content of the magnetic powder in the final pellets of the resin composition varies or the mixing/kneading of the binder resin and the magnetic powder becomes insufficient; and at the worst case, the mixing/kneading of the binder resin and the magnetic powder becomes impossible.

(2) If the resin composition is produced by using pellets of a resin binder, the accuracy in supplying a magnetic powder and the resin is degraded, to vary the extruding rate, which may obstruct the stable production of the resin composition.

(3) If the content of a magnetic powder in the pellets of the resin composition varies, the magnetic characteristic of a product molded from the resin composition also varies, resulting in not only degradation of quality in terms of magnetic characteristic but also lowering of the production yield and frequent occurrence of defectives.

The method of producing the resin composition characterized by pulverizing pellets of a binder resin once, however, has the following problems: namely, since the method requires a pulverizer for pulverizing pellets of a binder resin, the cost of equipment is raised, and since the method additionally requires the pulverizing step, the cost required for preparing a raw material is raised, thereby increasing the production cost of a resin magnet produced from the resin composition.

SUMMARY OF THE INVENTION

A first object of the present Invention is to provide a synthetic resin composition for a resin magnet, which is good in flowability upon melting, and which is capable of keeping the good flowability upon melting even if the content of a magnetic powder is increased and obtaining a high magnetic force of a molded product without lowering the moldability, and to provide a resin magnet molded from the synthetic resin composition.

A second object of the present invention is to provide a synthetic resin composition for a resin magnet, which is capable of preventing a reduction in dimensional accuracy due to contraction after molding as much as possible and also effectively preventing occurrence of expansion and camber due to an environmental change, thereby certainly obtaining a resin magnet excellent in dimensional accuracy by using the synthetic resin composition, and to provide a resin magnet molded from the synthetic resin composition.

A third object of the present invention is to provide a process of producing pellets of a synthetic resin composition for a resin magnet by mixing and dispersing a magnetic powder in a resin binder and extruding the mixture into pellets, which process is capable of reducing the production cost by omitting the step of pulverizing pellets of the resin binder.

From an examination to achieve the first object, the present inventor has found that, in the case of preparing a synthetic resin composition for a resin magnet by mixing and dispersing a magnetic powder in a resin binder composed of a thermoplastic resin, the addition of a polymerized fatty acid based polyamide elastomer to the resin binder makes it possible to effectively improve the flowability of the resin composition upon melting and keep a good flowability upon melting even if the content of the magnetic powder is increased for enhancing the magnetic force of a molded product, and hence to obtain a resin magnet having a high magnetic force without occurrence of lowering of moldability due to a reduction in flowability upon melting. The present inventor has thus accomplished the following first invention:

According to the first invention, there are provided a synthetic resin composition for a resin magnet, including a resin binder containing a thermoplastic resin as a main component and a polymerized fatty acid based polyamide elastomer, and a magnetic powder mixed and dispersed in said resin binder; and a resin magnet obtained by molding the synthetic resin composition into a desired shape.

To achieve the second object, the present inventor has examined principal causes of the reduction in dimensional accuracy, and obtained the following knowledge:

(1) If a crystalline resin such as polyamide or polyolefinic resin is used as the binder resin, the crystallinity of the binder resin rapidly proceeds when a molded product is cooled, which tends to enlarge the contraction and shrinkage of the molded product and to cause a camber of the molded product.

(2) If a hygroscopic resin such as polyamide is used as the binder resin, a molded product may be often expanded due to absorption of moisture in a service environment, which results in the environmental change in dimension.

The present inventor has further examined to solve these inconveniences, and found that the suitable addition of an ultra fine powder of an inorganic filler, having an average particle size of 1 $\mu$m or less, to the binder resin in addition to a magnetic powder makes it possible to retard or obstruct the crystallinity of the binder resin when a molded product is cooled and thereby improve the dimensional accuracy of the molded product by suppressing the contraction thereof and also to suppress permeation of water molecules in the resin composition and thereby suppress the dimensional change due to moisture in a service environment, and hence to effectively solve the above-described inconveniences associated with the dimensional accuracy and to obtain a resin magnet which has a good dimensional accuracy and is capable of keeping such a good dimensional accuracy. The present inventor has thus accomplished the following second invention:

According to the second invention, there are provided a synthetic resin composition for a resin magnet, including a resin binder, a magnetic powder mixed and dispersed in said resin binder, and an ultra fine powder of an inorganic filler added to said resin binder, said powder having an average particle size of 1 $\mu$g or less; and a resin magnet obtained by molding the synthetic resin composition into a is desired shape.

From an examination to achieve the third object, the present invention has found that, the adoption of a process of mixing pellets of a binder resin with a magnetic powder on a batch processing basis, supplying the mixture to an extruder at a relatively high speed by using a counting feeder, and extruding the mixture by the extruder makes it possible to produce pellets of a resin composition, in which the magnetic powder is mixed and dispersed in the binder resin desirably at a practical level, even if the step of pulverizing the pellets of the binder resin is omitted, and hence to produce a resin magnet such as a magnet roller having a sufficient performance at a low cost by injection-molding or extrusion-molding the resin composition thus produced into a desired shape. The present inventor has thus accomplished the following third invention:

According to the third invention, there is provided a process of producing pellets of a synthetic resin composition for a resin magnet, including the steps of mixing pellets of a binder resin with a magnetic powder on a batch processing basis, supplying the mixture to a kneading-extruder by means of a counting feeder, and extrusion-molding the mixture, to obtain pellets of a molding material for a resin magnet, in which the magnetic powder is mixed and dispersed in the binder resin.

The present inventor has examined to further improve the above-described process of producing a synthetic resin composition for a resin magnet and found that, when the extrusion speed upon extrusion-molding of the mixture of pellets of a binder resin and a magnetic powder is set at 30 kg/h or more per average volume of 100 mm$^3$ of pellets, it is possible to further improve the uniform dispersibility of the magnetic powder, and when the pellets of resin composition thus obtained are uniformly mixed to be molded into a resin magnet, it is possible to obtain a resin magnet having a performance, particularly, a magnetic characteristic, comparable to or superior to that of a resin magnet obtained by using a resin composition prepared in accordance with the conventional process including the pulverizing step.

Accordingly, as one preferable aspect of the third invention, there are provided a process of producing a synthetic resin composition for a resin magnet, wherein the extrusion-speed by the kneading-extruder is set at 30 kg/h or more per average volume of 100 mm$^3$ of pellets, and a process of producing a synthetic resin composition for a resin magnet, wherein the pellets of resin composition obtained by extrusion-molding are uniformly mixed to each other.

DETAILED DESCRIPTION OF THE PREFERRED EMBODIMENTS

Hereinafter, the present invention will be described in detail.

A synthetic resin composition for a resin magnet according to a first invention is produced by mixing and dispersing a magnetic powder in a resin binder containing a thermoplastic resin as a main component and a polymerized fatty acid based polyamide elastomer.

Specific examples of the thermoplastic resins used as the main resins of the above resin binders, may include a polyamide resin (such as polyamide 6, polyamide 12), a polystyrene resin, a polyethylene terephthalate resin (PET), a polybutylene terephthalate resin (PBT), a polyphenylene sulfide resin (PPS), an ethylene-vinyl acetate copolymer resin (EVA), an ethylene ethyl acrylate resin (EEA), an epoxy resin, an ethylene-vinyl alcohol copolymer resin (EVOH), a polypropylene resin (PP), a polyolefin such as polyethylene or polyethylene co-polymer, and a modified polyolefin by introducing functional groups having reactivity such as maleic anhydride groups, carboxyl groups, hydroxyl groups, or glycidyl groups to the structure of the polyolefin. These thermoplastic resins can be used singly or in combination.

The content of the above main resin is not particularly limited but may be set in a range of about 1 to 20 wt %, preferably, 4 to 16 wt % on the basis of the total weight of the resin composition. If the content is less than 1 wt %, the flowability of the molten resin composition may become insufficient even if the polymerized fatty acid based polyamide elastomer is added to the main resin, and further a resin magnet molded from the resin composition may become very brittle. On the other hand, if the content of the main resin is more than 20 wt % since the content of the magnetic powder becomes relatively small, it may become difficult to obtain a high magnetic force.

As the polymerized fatty acid based polyamide elastomer added to the main resin, an elastomer expressed by the following structural formula (1) may be preferably used.

(1)

(Where PA is a polymerized fatty acid based polyamide skeleton, PE is a polyether ester skeleton, and "a", "b", and "n" are each in a range of 1 to 50.)

The polymerized fatty acid based polyamide elastomer is commercially available, typically, under the trade name of "TPAE8", "TPAE10.C", "TPAE10.HP", or "TPAE12" (produced by Fuji Kasei Co., Ltd.).

The added amount of the polymerized fatty acid based polyamide elastomer is not particularly limited and can be suitably selected depending on the kind of the main resin, the content of the magnetic powder, and the like but may be set in a range of 0.1 to 10 wt %, preferably, 0.5 to 5 wt % on the basis of the total weight of the resin composition. If the added amount is less than 0.1 wt %, the effect of improving the flowability of the resin composition upon melting may become insufficient, and if the added amount is more than 10 wt %, since the content of the magnetic powder becomes small, it may become difficult to obtain a sufficient magnetic force characteristic.

As the magnetic powder mixed and dispersed in the binder resin containing the main resin and the polymerized fatty acid based polyamide elastomer, there can be used a known magnetic powder for a resin magnet. Specific examples of the magnetic powders may include a powder of ferrite such as Sr ferrite or Ba ferrite, and a powder of a rare earth based alloy such as a Sm—Co alloy, a Sm—Fe—N alloy, an Nd—Fe—B alloy, or a Ce—Co alloy.

The average particle size of the magnetic powder used for the present invention is not particularly limited, but from the viewpoints of flowability of the resin composition upon melting, orientation of the magnetic powder, the content of the magnetic powder, and the like, it may be set in a range of about 0.05 to 300 μm; preferably, about 0.1 to 100 μm.

The magnetic powder may be subjected to a known pre-treatment as needed, before being mixed in the resin composition for a resin magnet. In this case, while not particularly limited, the magnetic powder may be preferably subjected to a coupling treatment by using a known coupling agent such as a silane coupling agent or a titanate coupling agent. The pre-treatment of the magnetic powder by using such a coupling agent is advantageous in effectively improving the flowability of the resin composition, which contains a large amount of the magnetic powder, upon melting.

Specific examples of the above silane coupling agents may include γ-aminopropyltriethoxysilane, γ-aminopropyltrimethoxysilane, N-β-(aminoethyl)-γ-aminopropyltrimethoxysilane, ureidopropyltriethoxysilane, vinyltriethoxysilane, vinyltrimethoxysilane, vinyltris(β-methoxyethoxy)silane, γ-methacryloxypropyltrimethoxysilane, γ-methacryloxypropyltriethoxysilane, β-(3,4-epoxycyclohexyl)ethyltrimethoxysilane, γ-glycidoxypropyltrimethoxysilane, γ-mercaptopropyltrimethoxysilane, γ-isocyanate propyltriethoxysilane, methyltriethoxysilane, and methyltrimethoxysilane. In particular, γ-aminopropyltriethoxysilane, γ-aminopropyltrimethoxysilane, and N-β-(aminoethyl)-γ-aminopropyltrimethoxysilane may be preferably used.

Specific examples of the above titanate based coupling agents may include isopropylbis(dioctylpyrophosphate) titanate, isopropyltri(N-aminoethyl.aminoethyl) titanate, isopropyltriisostearoyl titanate, diisopropylbis (dioctylpyrophosphate) titanate, tetraisopropylbis (dioctylphosphite) titanate, tetraoctylbis (ditridecylphosphite) titanate, tetra(2,2-diallyloxymethyl-1-butyl)bis(ditridecyl)phosphite titanate, bis (dioctylpyrophosphate) oxyacetate titanate, and bis (dioctylpyrophosphate) ethylenetitanate. In particular, isopropylbis(dioctylpyrophosphate) titanate may be preferably used.

The content of the magnetic powder is not particularly limited and can be suitably selected depending on the strength of a magnetic force required for a target molded product, but may be generally set in a range of 80 to 99 wt % of the total weight on the basis of the resin composition for a resin magnet. In particular, according to the present invention, even if the magnetic powder is contained in the resin composition in an amount of 90 wt % or more, the flowability of the molten resin composition can be desirably kept, so that the resin composition can be molded with good moldability into a resin magnet having a high magnetic force. While the effect of the present invention becomes significant when the magnetic powder is contained in the resin composition in a large amount, typically, 90 wt % or more as described above, the resin composition of the present invention is advantageous in terms of uniform dispersibility of the magnetic powder even when the magnetic powder is contained in the resin composition in an amount of about 80 to 90 wt %.

The resin composition for a resin magnet, which contains the above main resin, polymerized fatty acid based polyamide elastomer, and magnetic powder, may contain, while not limited thereto, a suitable amount of an antioxidant for preventing deterioration of the binder resin due to oxidation. As the antioxidant, a known antioxidant can be, not exclusively, used, for example, a hindered phenol based, hindered amine based or phosphorus based antioxidant.

The added amount of the antioxidant is not particularly limited and can be suitably selected depending on the kind of the antioxidant and the kind of the binder resin, but may be generally set in a range of 0.1 to 20 wt %, preferably, 0.1 to 3 wt % on the basis of the total weight of the resin composition for a resin magnet.

The synthetic resin composition for a resin magnet according to the present invention may contain a dispersing agent for dispersing the magnetic powder, a lubricant, or a plasticizer in a suitable amount, as needed.

Specific examples of the dispersing agents may include a phenol-based dispersing agent and an amine-based dispersing agent. Specific examples of the lubricants may include a wax such as paraffin wax or microcrystalline wax, and a fatty acid such as stearic acid or oleic acid or a metal salt thereof such as calcium stearate or zinc stearate. Specific examples of the plasticizers may include a monoester based or polyester based plasticizer, and an epoxy based plasticizer.

The resin composition for a resin magnet may further contain a bulking agent having a large reinforcement effect, such as mica, whiskers, talc, carbon fibers, or glass fibers in such a range as not to obstruct the function of the resin composition. To be more specific, if a magnetic force required for a molded product is relatively small and thereby the content of the magnetic powder is relatively small, the rigidity of the molded product becomes relatively low. In this case, a bulking agent such as mica or whiskers is added to the resin composition, to enhance the rigidity of the molded product, thereby reinforcing the molded product. In particular, mica or whiskers may be preferably used as the bulking agent. Specific examples of the whiskers may include non-oxide based whiskers made from silicon carbide or silicon nitride; metal oxide based whiskers made from ZnO, MgO, $TiO_2$, $SnO_2$ or $Al_2O_3$; and compound oxide whiskers made from potassium titanate, aluminum borate, or basic magnesium sulphate. Of these whiskers, the compound oxide based whiskers may be preferably used because they can easily form a compound oxide with a plastic material.

The content of the bulking agent is not particularly limited but may be generally set in a range of about 1 to 50 wt %, preferably, about 5 to 20 wt % on the basis of the total weight of the resin composition. The resin composition for a resin magnet according to the present invention may further contain an additive other than the above-described dispersing agent, lubricant, plasticizer, and bulking agent, for example, an organic tin based stabilizer in a suitable amount, as needed.

A resin composition for a resin magnet according to a second invention is produced by adding an ultra fine powder of an inorganic filler, together with a magnetic powder, to a binder resin. Such a resin composition is effective to improve the dimensional accuracy of a product molded therefrom.

As the binder resin, there can be used the same resin as the thermoplastic resin used as the main component of the binder resin of the first invention. In this case, while not exclusively, the effect of the second invention becomes significant when a crystalline resin such as a polyamide or polyolefin is used as the binder resin. In particular, when a polyamide having a hygroscopicity is used as the binder resin, the second invention exhibits a significant effect capable of suppressing the dimensional change of a molded product due to absorption of moisture. According to the second invention, the polymerized fatty acid based polyamide elastomer used in the first invention can be similarly added to the main resin. In this case, the added amount of the polymerized fatty acid based polyamide elastomer may be set in the same range as that described in the first invention.

The content of the binder resin is not particularly limited but may be set in a range of about 5 to 50 wt %, preferably, about 7 to 20 wt % on the basis of the total weight of the resin composition for a resin magnet. If the content is less than 5 wt %, the moldability of the resin composition may become insufficient, and thereby the mechanical strength of a molded product may become insufficient. On the other hand, if the content is more than 50 wt %, the content of the magnetic powder becomes relatively deficient, and thereby the magnetic characteristic of a molded product may become insufficient.

The magnetic powder to be mixed and dispersed in the binder resin may be the same as that described in the first embodiment, and may be subjected to the same pre-treatment as that described in the first invention.

The content of the magnetic powder is not particularly limited and can be selected depending on the strength of a magnetic force required for a target molded product, but may be generally set in a range of 50 to 95 wt %, preferably, 80 to 93 wt % on the basis of the total weight of the resin composition for a resin magnet.

The resin composition for a resin magnet according to the second invention, which basically contains the binder resin and the magnetic powder mixed and dispersed in the binder resin, further contains a suitable amount of an ultra fine powder of an inorganic filler having an average particle size of 1 μm or less for preventing the contraction of a molded product and the degradation of the dimensional accuracy of the molded product due to absorption of moisture.

The wording "the average particle size of 1 μg or less" means that the size of each particle of the inorganic filler observed by using SEM photograph is 1 μg or less. The specific examples of the inorganic fillers may include a synthetic silicate filler such as synthetic aluminum silicate or synthetic calcium silicate; a natural silicate filler such as kaolin, clay, pyrophyllite, bentonite, sericite, or lamellar mica; whiskers, for example, non-oxide whiskers made from silicate, aluminum hydrate, barium sulfate, calcium sulfate, calcium carbonate, magnesium carbonate, a metal oxide, inorganic fibers, silicon carbonate, or silicon nitride, metal oxide whiskers made from ZnO, MgO, $TiO_2SnO_2$, or $Al_2O_3$, and compound oxide based whiskers made from potassium titanate, barium titanate or aluminum borate; and other fillers such as mica, a metal powder, carbon, and glass. While not exclusively, the silicate filler may be preferably used because it can be pulverized into an ultra fine powder.

The average particle size of the ultra fine powder of an inorganic filler, which is set in the range of 1 μm or less as described above, may be preferably set in a range of 0.5 μm or less, more preferably, 0.01 to 0.3 μm.

A process of finely dispersing the ultra fine powder of an inorganic filler in the resin composition for a resin magnet is not particularly limited but may be suitably carried out, for example, by adding and finely mixing the filler having been mechanically pulverized, or adding and finely mixing the filler self-pulverizable by cleavage (typically, silicate filler) to and in the binder resin upon preparation of the binder resin.

The content of the ultra fine powder of an inorganic filler is not particularly limited and can be suitably selected as needed, but may be generally set in a range of 0.1 to 10 wt %, preferably, 0.5 to 5 wt % in consideration of the content of the magnetic powder and the content of the binder resin.

The resin composition for a resin magnet according to the second invention, which contains the binder resin, magnetic powder, and the ultra fine powder of an inorganic filler, may further contain a dispersing agent for dispersing the magnetic powder, a lubricant, or a plasticizer in a suitable amount, as needed.

Each of the dispersing agent, lubricant, and plasticizer may be the same as that described in the first invention, and the content thereof may be also the same as that described in the first invention.

According to the second invention, like the first invention, the resin composition for a resin magnet may further contain a bulking agent having a large reinforcement effect, such as mica, whiskers, talc, carbon fibers, or glass fibers in such a range as not to obstruct the function of the resin composition.

The content of the bulking agent is not particularly limited but may be generally set in a range of 1 to 10 wt %, preferably, 2 to 5 wt % on the basis of the total weight of the resin composition for a resin magnet. It should be noted that the bulking agent is added as a component quite different from the ultra fine powder of an inorganic filler.

A molded resin magnet of the present invention can be obtained by molding the resin composition for a resin magnet according to the first or second invention into a desired shape. By using the resin composition of the first invention as the molding material, it is possible to obtain a molded resin magnet having a good dimensional accuracy, a small variation in magnetic force, and a high magnetic force. To be more specific, the resin composition of the first invention can keep its good flowability upon melting even if it contains a large amount of the magnetic powder for obtaining a high magnetic force, with a result that the resin composition can desirably flow in a cavity of a mold, that is, the moldability of the resin composition can be enhanced. As a result, it is possible to obtain a resin magnet such as a magnet roller having a high performance such as a high magnetic force without occurrence of an orientation failure of the magnetic powder in the mold, a filling failure of the resin composition, and a variation in filling density of the resin composition.

By using the resin composition for a resin magnet according to the second invention as the molding material, it is possible to prevent the contraction of a molded product and the reduction in dimensional accuracy due to absorption of moisture as much as possible, and hence to obtain a molded resin magnet having a good dimensional accuracy.

The molded resin magnet of the present invention can be obtained by kneading, melting and molding the above resin composition for a resin magnet by a suitable process selected depending on the size, shape, and the like of the resin magnet, for example, an injection-molding process, an extrusion-molding process, or a compression-molding process.

The application of the molded resin magnet of the present invention is not particularly limited but may be preferably a magnet roller used for a development mechanism of an electrophotographic system or electrostatic recording system. In general, a magnet roller includes a roller main body formed of a resin magnet, and a shaft projecting from both ends of the roller main body. In the case of applying the resin magnet of the present invention to a magnet roller, there may be adopted a process of setting a metal shaft in a mold and molding a roller main body around the outer periphery of the shaft by using the resin composition for a resin magnet, or integrally molding the shaft and roller main body by using the resin composition. In the case of applying the molded resin magnet to a magnet roller requiring a high, complicated magnetic characteristic, there may be adopted a process of molding a plurality of resin magnet pieces by using the resin composition for a resin magnet, and sticking these resin magnet pieces around the outer periphery of a metal shaft, to form a roller main body. In this case, all of the resin magnet pieces may be of course molded from the resin composition of the present invention; however, only those, requiring a particularly high magnetic force, of the resin magnet pieces may be molded from the resin composition of the present invention. The magnetization of the magnet roller may be performed simultaneously with molding by using a magnetic field formed around the mold, or may be performed after molding by using a known magnetizer.

A process of producing a resin composition for a resin magnet according to a third invention includes the steps of mixing a magnetic powder with pellets of a binder resin as a raw resin material, which pellets being not pulverized, in a batch processing basis, supplying the mixture to an extruder by means of a counting feeder, and molding the mixture into pellets by the extruder.

The binder resin used as the raw resin material may be suitably selected from extrusion-moldable resins in consideration of the application of the target resin magnet and the like. For example, the same resin as the thermoplastic resin used as the main component of the binder resin of the first invention can be used. In particular, while not exclusively, a polyamide resin, a polyphenylene sulfide resin, an ethylene-ethyl acrylate copolymer resin, ethylene-vinyl acrylate copolymer resin may be preferably used in terms of moldability, magnetic characteristic, dynamic property, and material cost. The polymerized fatty acid based polyamide elastomer used in the first invention can be similarly added to the binder resin. In this case, the added amount of the polymerized fatty acid based polyamide elastomer may be the same as that described in the first invention.

The raw resin material is generally commercially available in the form of pellets, and according to the present invention, pellets of the raw resin material are mixed to a magnetic powder. In this case, while not exclusively, the size of each pellet of the raw resin material may be set in a range of φ5×5 mm or less, preferably, φ4×4 mm to φ1×1 mm. If the size of the pellet is larger than φ5×5 mm, it may become impossible to sufficiently mix the raw resin material with the magnetic powder. If a plurality of raw resin materials are mixed, the sizes of respective pellets of the raw resin materials may be preferably set to be nearly equal to each other.

The magnetic powder to be mixed in the raw resin material may be the same as the magnetic powder used in the first invention, and may be subjected to the same pretreatment as that used in the first invention.

The average particle size of the magnetic powder is not particularly limited but may be set in a range of 0.5 to 500 μm, preferably, 1 to 100 μm. If the particle size of the magnetic powder is excessively small, it may become difficult to mix the magnetic powder with the raw resin material, thereby significantly reducing the uniformity in distribution of the magnetic powder. On the other hand, if the particle size of the magnetic powder is excessively large, it may become difficult to obtain a resin magnet having a good magnetic characteristic.

According to the production process of the present invention, pellets of the binder resin as the raw resin material is mixed with the magnetic powder in a batch processing basis, and the mixture is supplied to an extruder by means of a counting feeder and is molded into pellets by the extruder.

In this case, the mixing ratio between the binder resin and magnetic powder is not particularly limited and can be suitably selected depending on a magnetic force required for a target resin magnet. For example, the content of the magnetic powder may be generally set in a range of 70 to 97 wt %, preferably, 80 to 95 wt %. The amount of the mixture of the binder resin and magnetic powder mixed on the batch processing basis is not particularly limited but may be set in a range of about 5 to 500 kg, preferably, about 10 to 300 kg in terms of mixing operability and uniformity of the mixture.

Like the first invention, a bulking agent having a large reinforcement effect, such as mica, whiskers, talc, carbon fibers, or glass fibers can be added to the mixture in such a range as not to obstruct the function of the resin composition of the present invention, as needed. Further, like the second invention, an ultra fine powder of an inorganic filler can be similarly added to the mixture.

The mixing of the binder resin, magnetic powder, and an additive such as the bulking agent to each other on the batch processing basis can be performed, while not exclusively, by a known mixer. For example, the mixing may be performed at a rotating speed of 100 to 1000 rpm by using a mixer having stirring blades.

The mixture of the binder resin and magnetic powder mixed on the batch processing basis is supplied to an extruder by means of a counting feeder, and is extruded by a kneading unit of the extruder. In this way, pellets of the resin composition is obtained.

In this case, the extrusion speed upon extrusion-molding of the resin composition is not particularly limited but may be set in a range of 30 kg/h or more, particularly 50 to 500 kg/h per an average volume of 10 mm$^3$ of pellets. The extrusion-molding at such a relatively high speed makes it possible to prevent a failure caused by pulsation of the resin due to disturbance of the resin resulting from a reduction in extrusion speed, and hence to desirably knead the mixture and thereby certainly obtain a molding material in which the magnetic powder is uniformly dispersed. The kind of the extruder is not particularly limited, and uniaxial or biaxial kneading-extruder can be suitably used.

The other molding conditions such as a resin temperature and a cylinder temperature upon kneading are not particularly limited, and can be suitably set depending on the kind of the binder resin, and the like. The size and shape of each of the pellets of the resin composition can be suitably selected depending on the size and shape of a target resin magnet, and the molding process and molding conditions for the resin magnet.

According to the present invention, while not exclusively, the above pellets of the resin composition for a resin magnet may be, preferably but not exclusively, further mixed to each other and be injection-molded or extrusion-molded into a target resin magnet. If there occur slight variations in content of the magnetic powder between a large number of the pellets, the slight variations can be canceled because the pellets are mixed to each other at random, to obtain a molding material having a very high uniformity for each batch.

The resin composition for a resin magnet obtained by the production process of the present invention can be suitably used as a molding material for molding a resin magnet component used for an electrophotographic system or electrostatic recording system, particularly, a magnet roller used for a development mechanism of the above system. According to the production process of the present invention, it is possible to produce a high quality molding material, which is sufficiently used for the application requiring a high magnetic characteristic, at a low cost. The resin composition for a resin magnet obtained by the production process of the present invention is usable not only for the above-described resin magnet component of an electrophotographic system or electrostatic recording system but also for other applications, for example, a resin magnet component of a motor.

According to the process of producing a resin composition for a resin magnet according to the third invention, it is possible to omit the step of pulverizing a raw resin material and hence to reduce the production cost of the resin composition, and also to certainly obtain a high quality resin composition capable of molding a resin magnet having a good magnetic characteristic.

Hereinafter, the present invention will be described in detail with reference to, while not limited thereto, the following examples:

INVENTIVE EXAMPLE 1

Figure 1:
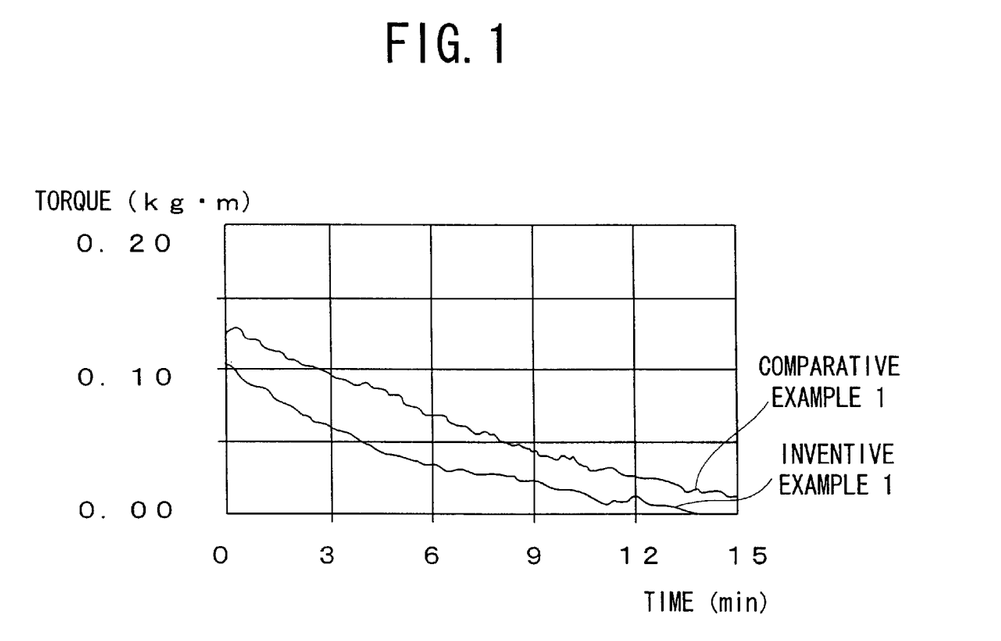
FIG. 1 is a graph showing a change in torque of a resin composition for a resin magnet, which is prepared in each of Inventive Example 1 and Comparative Example 1, upon kneading for preparation of the resin composition.

A raw powder of an Nd based rare earth magnet alloy having a composition of $Nd_{12}Fe_{78}Co_4B_6$ in atomic wt % (produced by General Motors Corporation under the trade name of "MQP-B") was pulverized into a powder having an average particle size of 100 μm, which was then subjected to surface treatment by a silane coupling agent (produced by Nippon Unicar Co., Ltd. under the trade name of "A1100"), to prepare a magnetic powder. Then, 188 g of this magnetic powder was mixed with 6.8 g of nylon 12 (produced by Ube Industries, Ltd. under the trade name of "P 3012 U"), 3.5 g of an antioxidant (produced by Chiba Specialty Chemicals Co., Ltd. under the trade name of "IRGANOX MD 1024", and 1.7 g of a polymerized fatty acid based polyamide elastomer (produced by Fuji Kasei Co., Ltd. under the trade name of "TPAE8"). The mixture was kneaded for 15 min at 50 rpm by a kneader [produced by Toyo Seiki Seisaku-Sho, Ltd. under the trade name of "Labo Plust Mill 50C150 Type" (capacity: 60 cm$^2$)] while being heated at 250° C., to prepare the resin composition for a resin magnet according to the first invention. During kneading, changes in torque of the melt were measured. The results are shown in FIG. 1. It should be noted that there is the following relationship between the torque value and the melt viscosity: namely, the higher the torque value, the higher the melt viscosity (that is, the lower the melt flowability). As shown in FIG. 1, for the resin composition produced in this example, the torque, that is, the viscosity of the melt did not tend to increase even after an elapse of 15 min.

The melt flow rate (MFR), as one index of the melt flowability, of the resin composition thus obtained was measured by a melt indexer (produced by Toyo Seiki Seisaku-Sho, Ltd.). As a result, the MFR was 66.7 g/10 min (250° C., 5 kg). This shows that the resin composition in this example has a good melt flowability.

The resin composition was injection-molded and magnetized, to prepare a columnar test piece having a diameter of 20 mm and a height of 6 mm. As a result of measurement, the magnetic energy product (BHmax) of the test piece was 6.8 MGOe. This shows that the test piece has a high magnetic force.

Comparative Example 1

A resin composition for a resin magnet was prepared in the same procedure as that described in Inventive Example 1, except that the polymerized fatty acid based polyamide elastomer was not used and instead the content of nylon 12 was increased up to 8.5 g. Like Inventive Example 1, during kneading, changes in torque of the melt were measured. The results are shown in FIG. 1. Further, like Inventive Example 1, the MFR of the resin composition, and the BHmax value of a test piece prepared by using the resin composition were measured.

As shown in FIG. 1, although there was no increase in torque of the melt, the MFR value [9.84 g/10 min (250° C., 5 kg)] of this resin composition was lower than that of the resin composition in Inventive Example 1. This shows that the melt flowability of the resin composition in Comparative Example 1 is inferior to that of the resin composition in Inventive Example 1. Further, the BHmax value (6.5 MGOe) of the test piece prepared by using this resin composition was lower than that of the test piece prepared by using the resin composition in Inventive Example 1. This shows that the magnetic force of the test piece prepared by using the resin composition in Comparative Example 1 is inferior to that of the test piece prepared by using the resin composition in Inventive Example 1.

INVENTIVE EXAMPLE 2

First, 50.00 kg of a powder of Sr ferrite (produced by Nippon Bengara Kogyo Co., Ltd. under the trade name of "NF110") and 20.55 kg of a powder of Ba ferrite (produced by Nippon Bengara Kogyo Co., Ltd. under the trade name of "DNP-S") were subjected to surface treatment by 0.71 kg of a silane coupling agent (produced by Nippon Unicar Co., Ltd. under the trade name of "A1160"), to prepare a magnetic powder. The magnetic powder was mixed with 12.5 kg of nylon 6 (produced by Ube Industries, Ltd. under the trade name of "P 1010", 0.42 kg of an antioxidant (produced by Chiba Specialty Chemicals Co., Ltd. under the trade name of "IRGANOX 245", and 0.42 kg of a polymerized fatty acid based polyamide elastomer (produced by Fuji Kasei Co., Ltd. under the trade name of "TPAE8"). The mixture was then kneaded by a biaxial kneader, followed by pelletization, to obtain pellets of the resin composition for a resin magnet of the first invention.

The melt flow rate (MFR) of the resin composition thus obtained was measured by the melt indexer (produced by Toyo Seiki Seisaku-Sho, Ltd.). As a result, the MFR was 156.77 g/10 min (270° C., 5 kg). This shows that the resin composition in this example has a good melt flowability. The resin composition was injection-molded while being applied with a magnetic field, to prepare a columnar resin magnet having a diameter of 9.6 mm. As a result of measurement, the surface magnetic force of the molded resin magnet was 804 Gauss.

Comparative Example 2

Pellets of a resin composition for a resin magnet were prepared in the same procedure as that described in Inventive Example 2, except that the polymerized fatty acid based polyamide elastomer was not used and instead the content of nylon 6 was increased up to 12.92 g.

Like Inventive Example 2, the MFR value of the resin composition was measured. As a result, the MFR value was 123.99 g/10 min (270° C., 5 kg). This shows that the melt flowability of the resin composition in Comparative Example 2 is inferior to that of the resin composition in Inventive Example 2. Like Inventive Example 2, a columnar resin magnet was prepared by using the resin composition thus obtained, and the surface magnetic force of the resin magnet was measured. As a result, the surface magnetic force of the resin magnet was 786 Gauss. This shows that the surface magnetic force of the resin magnet in Comparative Example 2 is inferior to that of the resin magnet in Inventive Example 2.

INVENTIVE EXAMPLE 3

First, 18 kg of anisotropic Sr ferrite (produced by Nippon Bengara Kogyo Co., Ltd. under the trade name of "NF110" was stirred, together with 180 g of a silane coupling agent (produced by Nippon Unicar Co., Ltd. under the trade name of "A1160"), by a high speed mixer for surface treatment, to prepare a magnetic powder. The magnetic powder was added to 2.455 kg of polyamide 6 [produced by Unichika, Ltd. under the trade name of "M1015D" (molecular weight: about 10000)] in which 2.5 wt % of a silicate filler (laminar silicate) having an average particle size of 0.1 $\mu$m was dispersed, and was kneaded by a biaxial kneader, followed by pelletization, to obtain pellets of the resin composition for a resin magnet of the second invention.

The resin composition thus obtained was injection-molded into a desired shape while being applied with a magnetic field, to obtain a resin magnet. The magnetic force of the resin magnet thus obtained was measured. As a result, the residual magnetic flux density was Br=0.2845 T, and the maximum energy product was BHmax=16.1 kJ/m$^3$.

Figure 2:
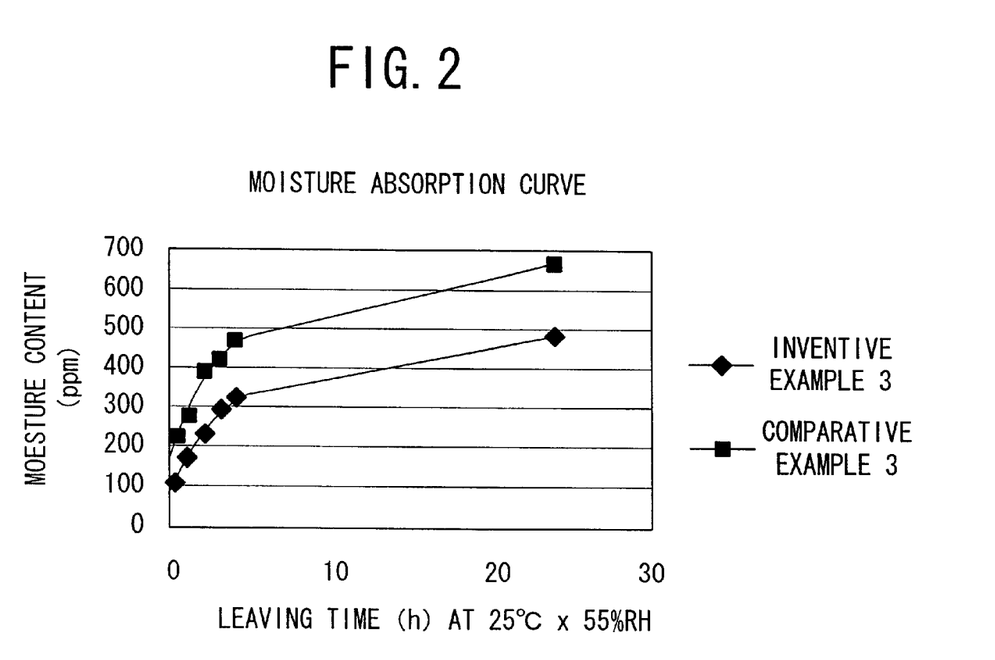
FIG. 2 is a graph showing the hygroscopicity of a resin composition for a resin magnet prepared in each of Inventive Example 3 and Comparative Example 3.
Figure 3:
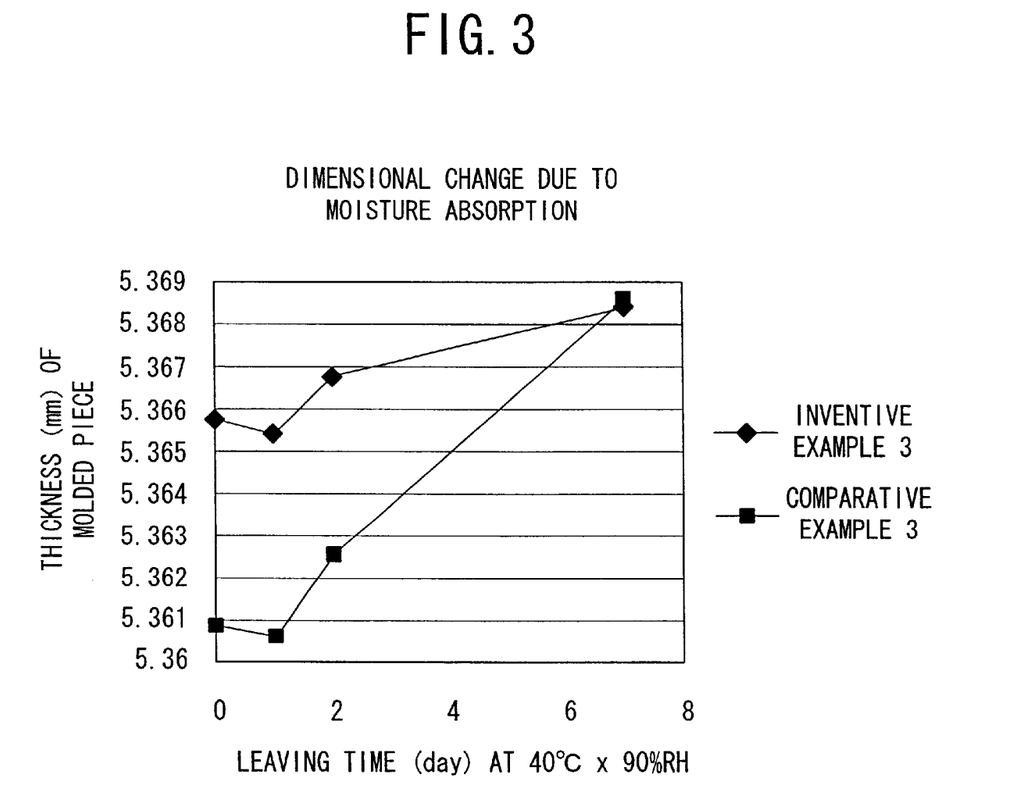
FIG. 3 is a graph showing a dimensional change due to hygroscopicity of a resin magnet molded from the resin composition prepared in each of Inventive Example 3 and Comparative Example 3.

Changes in coefficient of water absorption of the resin at 25° C. and 55% RH were evaluated. The results are shown in FIG. 2. Changes in dimension of the resin magnet due to moisture absorption under the condition that the resin magnet was left at a high temperature (40° C.) and high humidity (90% RH) were examined. The results are shown in FIG. 3.

Comparative Example 3

Pellets of a resin composition were obtained in the same procedure as that in Inventive Example 3, except that polyamide 6 containing the silicate filler was replaced with polyamide 6 [produced by Unichika, Ltd. under the trade name of "M1015D" (molecular weight: about 10000)] containing no silicate filler. The resin composition thus obtained was molded into a resin magnet in the same manner as that in Inventive Example 3. The magnetic force of the resin magnet after magnetization was measured. As a result, the residual magnetic flux density was Br=0.2571 T, and the maximum energy product was BHmax=13.2 kJ/m$^3$. This shows that the magnetic force characteristic of the resin magnet in Comparative Example 3 is slightly inferior to that of the resin magnet in Inventive Example 3.

Like Inventive example 3, changes in coefficient of water absorption of the resin magnet at 25° C. and 55% RH were evaluated. The results are shown in FIG. 2. Like Inventive Example 3, changes in dimension of the resin magnet due to moisture absorption were examined under the condition that the resin magnet was left at a high temperature (40° C.) and high humidity (90% RH). The results are shown in FIG. 3.

As described above, the resin magnet molded from the resin composition of the second invention in Inventive Example 3 exhibited a good magnetic force characteristic. Further, as shown in FIGS. 2 and 3, when compared with the resin composition containing no silicate filler in Comparative Example 3, the resin composition containing the silicate filler in Inventive Example 3 was smaller in moisture absorption (see FIG. 2) and also smaller in dimensional change due to moisture absorption (see FIG. 3).

INVENTIVE EXAMPLE 4

First, 18 kg of anisotropic Sr ferrite (produced by Nippon Bengara Kogyo Co., Ltd. under the trade name of "NF110" (average particle size: 1.4 μm) was stirred, together with 180 g of a silane coupling agent (produced by Nippon Unicar Co., Ltd. under the trade name of "A1160") by a high speed mixer, to be thus subjected to surface treatment. The magnetic powder was mixed with 2.225 kg of commercial polyamide 6 (produced by Ube Industries, Ltd. under the trade name of "1010X2") In the form of pellets (φ2×3 mm). The mixture was supplied to a biaxial kneader by means of a countering feeder, extrusion-molded at an extrusion speed of 50 kg/h per an average volume 10 mm$^3$ of pellets, and cut into specific dimensions, to obtain 15 kg of pellets each having a size of φ3×3 mm. The pellets thus obtained were uniformly mixed to each other by a rotary mixer, to obtain a resin composition for a resin magnet.

Part (15 g) of the resin composition was sampled and measured in terms of content of the ferrite. As a result, the content of the ferrite was in a range of 88.87 to 89.12%, which was nearly equal to the added amount of the ferrite.

On the other hand, the resin composition was injection-molded, to obtain a cylindrical resin magnet having a size of φ15 mm×240 mm. As a result of measurement, the surface magnetic force of the resin magnet after magnetization was in a range of 1100 to 1150 Gauss. This shows that the resin magnet prepared by using the resin composition in Inventive Example 4 has less variation in magnetic force.

Comparative Example 4

A resin composition for a resin magnet was prepared in the same procedure as that described in Inventive Example 4, except that the pellets of polyamide 6 were pulverized into particles having an average particle size of about 200 μm by using a pulverizer before mixed with the magnetic powder.

Like the Inventive Example 4, the content of the ferrite in the resin composition was measured. As a result, the content of the ferrite was in a range of 88.95 to 89.14%. This shows that the variation in content of the ferrite in Comparative Example 4 is nearly equal to that in Inventive Example 4. Like Inventive Example 4, the resin composition was injection-molded into a resin magnet. As a result of measurement, the surface magnetic force of the resin magnet after magnetization was in a range of 1100 to 1150 Gauss. This shows that the magnetic characteristic of the resin magnet in Comparative Example 4 is nearly equal to that of the resin magnet in Inventive Example 4.

In this way, the resin composition in Inventive Example 4, which is obtained by using non-pulverized pellets of the raw resin material, exhibits the quality comparable to that of the resin composition in Comparative Example 4, which is obtained by using the pulverized pellets of the raw resin material. This shows that the production process according to the present invention can reduce the production cost by omitting the pulverizing step.

INVENTIVE EXAMPLE 5

A resin composition was prepared in the same procedure as that described in Inventive Example 4, except that the supply speed of the counting feeder was slightly retarded to extrusion-mold the mixture at a extrusion-speed of 20 kg/h per an average volume 10 mm$^3$ of pellets.

Like Inventive Example 4, the resin magnet thus obtained was measured in terms of content of the ferrite. As a result, the content of the ferrite was in a range of 88.52 to 89.23%. This shows that the variation in content of the ferrite in Inventive Example 5 is slightly larger than that in Inventive Example 4; however, the variation is at the level with no problem from the practical viewpoint.

Like Inventive Example 4, the resin composition was injection-molded, to prepare a resin magnet. As a result of measurement, the surface magnetic force of the resin magnet after magnetization was in a range of 1090 to 1160 Gauss. This shows that the variation in magnetic force in Inventive Example 5 is slightly larger than that in Inventive Example 4; however, the variation is at the level with no problem from the practical viewpoint.

INVENTIVE EXAMPLE 6

A resin composition was prepared in the same procedure as that described in Inventive Example 4, except that the pellets obtained by extrusion-molding were not mixed by the rotary mixer.

Like Inventive Example 4, the resin composition thus obtained was measured in terms of content of the ferrite. As a result, the content of the ferrite was in a range of 88.17 to 91.34%. This shows that the variation in content of the ferrite in Inventive Example 6 is slightly larger than that in Inventive Example 4: however, the variation is at the level with no problem from the practical viewpoint. Like Inventive Example 4, the resin composition was injection-molded, to prepare a resin magnet. As a result of measurement, the surface magnetic force of the resin magnet after magnetization was in a range of 1080 to 1170 Gauss. This shows that the variation in surface magnetic force in Inventive Example 6 is slightly larger than that in Inventive Example 4, but the variation is at the level with no problem from the practical viewpoint. And, this example is advantageous in cost because the pulverizing step can be omitted.

While the preferred embodiments have been described using specific terms, such description is for illustrative purposes, and it is to be understood that changes and variations may be made without departing from the spirit or scope of the following claims.

What is claimed is:

1. A synthetic resin composition for a resin magnet, containing:
   a resin binder containing a thermoplastic resin as a main component and a polymerized fatty acid based polyamide elastomer; and
   a magnetic powder mixed and dispersed in said resin binder.

2. A synthetic resin composition for a resin magnet according to claim 1, wherein said polymerized fatty acid based polyamide elastomer has a basic structure expressed by the following structural formula:

(1)

where PA designates a polymerized fatty acid based polyamide skeleton, PE is a polyether ester skeleton, and "a", "b", and "n" are each in a range of 1 to 50.

3. A synthetic resin composition according to claim 1, further containing an antioxidant.

4. A synthetic resin composition for a resin magnet according to claim 3, wherein the contents of said magnetic powder, main resin, polymerized fatty acid based polyamide elastomer, and antioxidant are as follows:

| magnetic powder | 80 to 99 wt % |
|---|---|
| main resin | 1 to 20 wt % |
| polymerized fatty acid based polyamide elastomer | 0.1 to 10 wt % |
| antioxidant | 0.1 to 20 wt % |

5. A molded resin magnet produced by molding a synthetic resin composition for a resin magnet into a desired shape, said resin composition containing: a resin binder containing a thermoplastic resin as a main component and a polymerized fatty acid based polyamide elastomer; and a magnetic powder mixed and dispersed in said resin binder.

6. A molded resin magnet according to claim 5, wherein said polymerized fatty acid based polyamide elastomer has a basic structure expressed by the following structural formula:

(1)

where PA designates a polymerized fatty acid based polyamide skeleton, PE is a polyether ester skeleton, and "a", "b" and "n" are each in a range of 1 to 50.

7. A molded resin magnet according to claim 5, further containing an antioxidant.

8. A molded resin magnet according to claim 7, wherein the contents of said magnetic powder, main resin, polymerized fatty acid based polyamide elastomer, and antioxidant are as follows:

| magnetic powder | 80 to 99 wt % |
|---|---|
| main resin | 1 to 20 wt % |
| polymerized fatty acid based polyamide elastomer | 0.1 to 10 wt % |
| antioxidant | 0.1 to 20 wt % |

9. A molded resin magnet according to claim 8, wherein said molded resin magnet is a magnet roller used for a development step of an electrophotographic process.

10. A resin composition for a resin magnet, containing:
    a resin binder is selected from a group consisting of one or more of polyamide, polyphenylene sulfide; ethylene-ethyl acrylate copolymer, and ethylene-vinyl-acetate copolymer;
    a magnetic powder mixed and dispersed in said resin binder, wherein the content of the magnetic powder is in a range of 80 to 97 wt %; and
    an ultra fine powder of an inorganic filler added to said resin binder, said filler having an average particle size of 1 μm or less.

11. A resin composition for a resin magnet according to claim 10, wherein said ultra fine powder of an inorganic filler is a silicate filler.

12. A resin composition for a resin magnet according to claim 10, wherein the added amount of said ultra fine powder of an inorganic filler is in a range of 0.1 to 10 wt % on the basis of the total weight of said resin composition.

13. A molded resin magnet produced by molding a resin composition for a resin magnet into a desired shape, said resin composition containing: a resin binder is selected from a group consisting of one or more of polyamide, polyphenylene sulfide; ethylene-ethyl acrylate copolymer, and ethylene-vinyl-acetate copolymer; a magnetic powder mixed and dispersed in said resin binder, wherein the content of the magnetic powder is in a range of 80 to 97 wt %; and an ultra fine powder of an inorganic filler added to said resin binder, said filler having an average particle size of 1 μm or less.

14. A molded resin magnet according to claim 13, wherein said ultra fine powder of an inorganic filler is a silicate filler.

15. A molded resin magnet according to claim 13, wherein the added amount of said ultra fine powder of an inorganic filler is in a range of 0.1 to 10 wt % on the basis of the total weight of said resin composition.

16. A molded resin magnet according to claim 13, wherein said resin magnet is a magnet roller used for a development step of an electrophotographic process.

17. A process of producing pellets of a resin composition for a resin magnet, comprising the steps of:
    mixing pellets of a binder resin with a magnetic powder on a batch processing basis;
    supplying the mixture to a kneading-extruder by means of a counting feeder; and
    extrusion-molding the mixture to obtain pellets of a molding material for a resin magnet, in which the magnetic powder is mixed and dispersed in the binder resin, wherein the binder resin is selected from a group consisting of one or more of polyamide, polyphenylene sulfide; ethylene-ethyl acrylate copolymer, and ethylene-vinyl-acetate copolymer and wherein the content of the magnetic powder is in a range of 80 to 97 wt %.

18. A process of producing a resin composition for a resin magnet according to claim 17, wherein the extrusion speed by said kneading-extruder is set at 30 kg/h or more per an average volume 10 mm$^3$ of pellets.

19. A process of producing a resin composition for a resin magnet according to claim 17, further comprising the step of uniformly mixing the pellets of said resin composition after extrusion-molding.

20. A process of producing a resin composition for a resin magnet according to claim 17, wherein the size of each of the pellets of binder resin is in a range of $\phi 5 \times 5$ mm or less, and the average particle size of the magnetic powder is in a range of 0.5 to 500 $\mu$m.

21. A process of producing a resin composition for a resin magnet according to claim 18, wherein the size of each of the pellets of binder resin is in a range of $\phi 5 \times 5$ mm or less, and the average particle size of the magnetic powder is in a range of 0.5 to 500 $\mu$m.

22. A process of producing a resin composition for a resin magnet according to claim 19, wherein the size of each of the pellets of binder resin is in a range of $\phi 5 \times 5$ mm or less, and the average particle size of the magnetic powder is in a range of 0.5 to 500 $\mu$m.

* * * * *